J. F. LAMB.
METHOD OF FORMING AND SECURING BOLSTERS TO CUTLERY.
APPLICATION FILED FEB. 28, 1911.
1,059,673.
Patented Apr. 22, 1913.
MODEL.
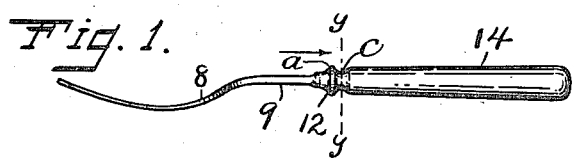
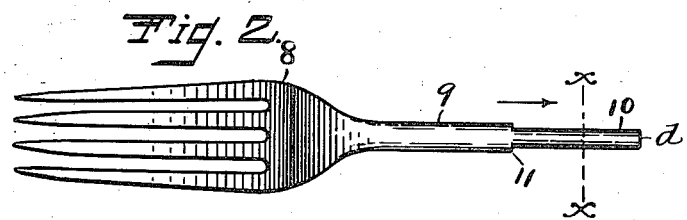
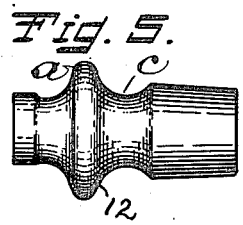
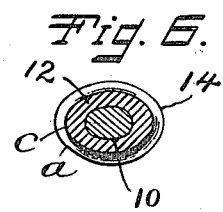
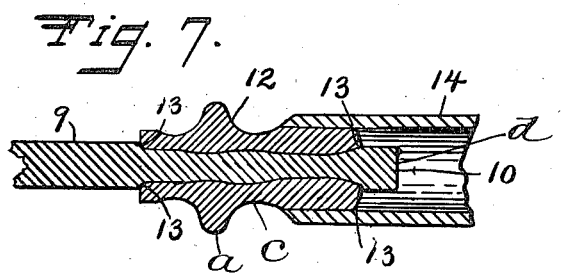
Witnesses
S. H. Clarke
N. L. Lockwood
Inventor.
Joseph F. Lamb.
By Louis M. Schmidt
Atty.

UNITED STATES PATENT OFFICE.

JOSEPH F. LAMB, OF NEW BRITAIN, CONNECTICUT, ASSIGNOR TO LANDERS, FRARY AND CLARK, OF NEW BRITAIN, CONNECTICUT, A CORPORATION.

METHOD OF FORMING AND SECURING BOLSTERS TO CUTLERY.

1,059,673. Specification of Letters Patent. Patented Apr. 22, 1913.

Application filed February 28, 1911. Serial No. 611,521. (Model.)

*To all whom it may concern:*

Be it known that I, JOSEPH F. LAMB, a citizen of the United States, residing at New Britain, in the county of Hartford and State of Connecticut, have invented certain new and useful Improvements in Methods of Forming and Securing Bolsters to Cutlery, of which the following is a specification.

My invention relates to the art of forming and securing bolsters to articles of cutlery, and the main objects of my improvement are economy in production and superiority of the product.

In the accompanying drawing:—Figure 1 is a side elevation of a table fork which is the product of my process or method. Fig. 2 is an enlarged plan view of a table fork with its shank prepared for the reception of a bolster. Fig. 3 is a still further enlarged transverse section of the said shank on the line $x\ x$ of Fig. 2. Fig. 4 is an end view of a bolster blank for attachment to the said fork. Fig. 5 is a side elevation of the same. Fig. 6 is a transverse section of the fork shown in Fig. 1, taken on the line $y\ y$. Fig. 7 is a central longitudinal section of the bolster portion of my fork, the ends of the fork and handle being broken away.

Heretofore bolsters have been formed integrally with the shank, cast thereon, and separately formed and secured in various ways to various articles of table cutlery, including knives, forks, steels, etc., all of which methods have various objections or disadvantages that are not present in my method.

I have illustrated my method as applied to a table fork but it is obvious that it may also be applied to various other cutlery articles. The tines and main body 8 of the fork blank may be of any ordinary construction with any ordinary form of shank 9. This shank is ordinarily of an oval form in cross section and may be of any desired length according to the kind of handle to be employed and the manner of securing the said handle. The end 10 of the shank 9, I reduce sufficiently to give it a round form in cross section as shown in Fig. 3, and so as to form a slight shoulder 11, Fig. 2. This completes the preparation of the fork for the reception of the bolster blank.

The bolster blank Figs. 4 and 5, may be of any desired contour in side view, but instead of the ordinary oval form in cross section, or end view, I first produce them of a round or circular form and with a cylindrical hole through the center for the reception of the cutlery shank 9, to which they are to be applied. I prefer to make these blanks of soft iron or steel and form them by drilling and turning. Being of a round, instead of an oval form, these blanks may be readily formed by automatic machines and hence produced at a small cost.

When produced by any process of the desired round form and of the desired design in side view, I place the bolster blank on the cylindrical portion of the shank with one end in contact with the shoulder 11. The bolster blank and portion of the shank within the same is then subjected when cold to pressure between dies of an oval form in cross section, thereby changing the round bolster blank and round shank into an oval form as shown in Figs. 1 and 6. This operation not only changes the form of bolster blank but it also firmly secures the bolster and shank beyond any liability of accidental displacement. The oval form of the shank and interior of the oval bolster hold the bolster against displacement rotatively, while the flattening of the holes in the bolster and the portion of the shank inclosed therein also forms shoulders 13 on the flattened side of the shank at each end of the bolster 12 as shown in Fig. 7, thereby firmly securing the bolster against displacement longitudinally.

The shoulders 13 on opposite sides of the shank at each end of the bolster will necessarily result from the mere act of changing the cross-sectional form of the bolster blank, as assembled on the shank, from its circular to an oval form throughout its length. When the bolster is of the special ribbed and necked form herein shown there will also be a shouldered effect at various points between the shoulders 13 at the respective ends of the bolster, but the said shoulders 13 will be formed, if the shank extends the entire length of the bolster no matter what the side contour of the bolster blank may be between its ends. This is because the shape of the hole through the bolster blank and that portion of the shank within the said hole are changed to varying extents at different parts in their length. For example, the shank is flattened to a greater extent at the junction of the end shoulders 13 and reduced body of the shank, than it is at any other point in the length of the shank between the said junction and handle end $d$ of the said shank. This result is best shown at the handle end $d$ of the bolster in Fig. 7 and the said shoulders at this end firmly hold the bolster against longitudinal displacement toward the handle end $d$. The intermediate shouldered effect also tends to more securely hold the bolster. The general rule, as to the extent of the varying changes in shape is that the thicker the surrounding wall of the bolster, the more the shank will be flattened. This however is subject to change by the proximity of the ends of the bolster as shown in the end shoulders 13, and by the length of each different diameter. For example, the bolster at the handle end is of less diameter than it is at the bead or rib $a$ in front of the neck $c$, but the rib is of less extent longitudinally, consequently this thinner wall of greater length at the handle end reduces the shank to a greater extent than does the thicker wall of less length at the said rib $a$.

The shouldered effect of the shank between the shoulders 13 is due to the flattening of the circular bolster blank of varying diameters at different points of its length. All of the shoulders including the shoulders 13 at each end are the result of simultaneously changing the cross-sectional shape of the ribbed and necked bolster blank when on the shank, from its circular to an oval form whereby the shank is also changed from a circular to an oval form to varying extents at different parts in its length.

A handle may be applied in any ordinary manner. As shown I have applied an ordinary form of hollow handle 14 into the end of which one end of the bolster is received and may be soldered thereto in any ordinary manner. While the bolster is both rigidly and permanently secured to the shank beyond any liability of accidental displacement, I prefer to solder the joints in order to prevent the possibility of any solution passing into the joints during the plating process.

By my improvement the bolster blanks may be formed by automatic machines and of any desired material, and thus produced at a very small cost. They may also be formed without any scale, leaving a bright and smooth surface that requires but little subsequent finishing. The round form of shank may also be milled or otherwise cheaply formed by machinery. Pressing the bolster blanks in dies especially when cold, not only changes their form and that of the shank, thus securing the two together, but also gives a smooth and neat finish to the bolster so that the final finish can be made at a small cost.

I claim as my invention:—

1. That improvement in the art of forming bolsters for cutlery which consists of giving the external form thereto by first forming a bolster blank separate and distinct from the handle and cutlery implement for which it is designed, and of a circular form in cross-section from end to end with varying diameters at various parts in its length, thereby giving it the general contour in side view of the finished bolster, and second changing the cross-section of that blank from its circular to an oval form throughout its length by means of dies that correspond in side view with the general contour of the said blank.

2. That improvement in the art of forming and securing bolsters to articles of cutlery which consists of preparing bolster blanks of a circular form in cross-section with a cylindrical hole therethrough, and also producing cutlery blanks with cylindrical shanks, assembling the said bolster blanks on the said shanks, and then changing that circular cross-sectional form of the said blanks and also that portion of the said cylindrical shanks within the said hole simultaneously into an oval form by pressing the said bolsters in dies when the said parts are so assembled.

3. That improvement in the art of forming bolsters for cutlery which consists in first forming of steel a circular blank in varying diameters of a ribbed and necked form in side view and with a bright, smooth and clean worked surface, and second flattening the said blank to an oval form by cold pressure in dies when the interior of the blank is supported by metal that extends from the circumference to the axis of the said blank and at the same time preserving the general contour of the said blank in the oval bolster.

4. That improvement in the art of forming and securing bolsters to articles of cutlery which consists of preparing bolster blanks of a given form in cross section with a hole therethrough, the sides of which are parallel to the axis of the said blank, and also preparing cutlery blanks with shanks, the sides of which are parallel to the axis thereof, assembling the said bolster blanks on the said shanks and then forming locking shoulders by simultaneously changing the shape, in cross-section of the said hole and shank to varying extents at different parts in their length while the said blanks are so assembled.

5. That improvement in the art of forming bolsters for cutlery which consists of first forming a bolster blank of a circular form in cross-section and of a special ribbed and necked contour in side view corresponding with that designed for the finished bolster, and second flattening the said circular bolster blank on diametrically opposite sides and forcing the metal outwardly therefrom laterally in opposite directions thereby changing that circular form to an oval while retaining the special side contour in the finished bolster that was first given to the said blank.

6. That improvement in the art of forming and securing bolsters to articles of cutlery which consists of first forming bolster blanks of a circular form in cross-section with a cylindrical hole therethrough and of a special contour in side view that gives varying thicknesses to the walls of the said cylindrical hole at different points in the length of the said blank, and also forming cutlery blanks with cylindrical shanks, assembling the said bolster blanks on the said cylindrical shanks and then simultaneously flattening the said bolster blanks and the said cylindrical shanks while so assembled on diametrically opposite sides and forcing the metal outwardly therefrom laterally in opposite directions thereby changing that circular form of both of the said parts, including the said cylindrical hole, to an oval while retaining in the finished bolster that special contour which was first given to the said bolster blanks.

JOSEPH F. LAMB.

Witnesses:
G. A. DOWNS,
JOHN W. ABELL.